Dec. 20, 1966   K. H. LORENZ   3,292,939
WORK HOLDING DEVICE

Filed Oct. 21, 1964   4 Sheets-Sheet 1

INVENTOR.
KARL H. LORENZ

BY  *Gregg & Stidham*
ATTORNEY

INVENTOR.
KARL H. LORENZ

Dec. 20, 1966     K. H. LORENZ     3,292,939
WORK HOLDING DEVICE

Filed Oct. 21, 1964     4 Sheets-Sheet 3

INVENTOR.
KARL H. LORENZ

BY *Gregg & Stidham*
ATTORNEY

Dec. 20, 1966  K. H. LORENZ  3,292,939
WORK HOLDING DEVICE
Filed Oct. 21, 1964  4 Sheets-Sheet 4

INVENTOR.
KARL H. LORENZ
BY Gregg & Stidham
ATTORNEY

United States Patent Office

3,292,939
Patented Dec. 20, 1966

3,292,939
WORK HOLDING DEVICE
Karl H. Lorenz, 730 Barron Ave., Space 109,
Redwood City, Calif. 94063
Filed Oct. 21, 1964, Ser. No. 405,452
5 Claims. (Cl. 279—50)

This invention relates to a work holding apparatus, and more particularly to a chuck for holding a workpiece, or the like.

The apparatus of this invention is adapted for use with machine tools for supporting a workpiece relative to the cutting tool. It may, for example, be attached to the spindle of a conventional lathe for rotatable support of a workpiece, or it may be fixed secured as to the bed of a milling machine for the stationary support of a workpiece. The apparatus is, of course, not limited to any particular use.

If the same machining operation or operations are to be performed on a plurality of like workpieces, it is often highly desirable that the workpieces be chucked at the same axial position. With many prior art chucks the workpieces are located at the same axial position only if they are of the same diameter. The axial position of under and oversized workpieces will not be the same as those of nominal size, and therefore, time consuming adjustments of the axial position of the chuck and/or the tool holder are required to properly, relatively, axially position the workpiece with the tool. Machining operations which require such individual adjustments to accommodate a range of workpiece sizes are time consuming and also subject to error in making the adjustments. Some prior art chucks are known in which the work holding device remains axially fixed but such arrangements are complicated and expensive to produce.

An object of this invention is the provision of an improved chuck which does not have the above-mentioned shortcomings of prior art chucks.

An object of this invention is the provision of a work holding apparatus which is of simple construction and easily adjusted for gripping over and undersized workpieces.

An object of this invention is the provision of a chuck of a simple design in which workpieces of different diameter may be gripped without change or adjustment of the axial position of the work holding device.

These and other objects and advantages are obtained by use of a novel actuating means for actuation of a conventional work holding device such as a collet chuck, step chuck or the like. A movable actuating sleeve is provided which has a tapered bore section adapted for engagement with the tapered or flared portion of the work holding device. The outer wall of the actuating sleeve is provided with a tapered wall portion which is engaged by a plurality of radially movable force transmitting members which may be in the form of balls. By moving the balls in an inwardly radial direction the actuating sleeve is driven axially for clamping actuation of the work holding device. In accordance with this invention, novel movable adjusting means for adjustment of the axial position of the balls are provided whereby the actuating sleeve may be made to travel along different portions of the tapered outer wall of the collet or work holding device between chuck open and chuck closed positions. The degree to which the collet is closed by the actuating sleeve therefore depends upon the axial position of the novel adjusting means, and no axial adjustment of the collet is required.

In the drawings wherein like reference characters refer to the same parts in the several views.

Figure 1:
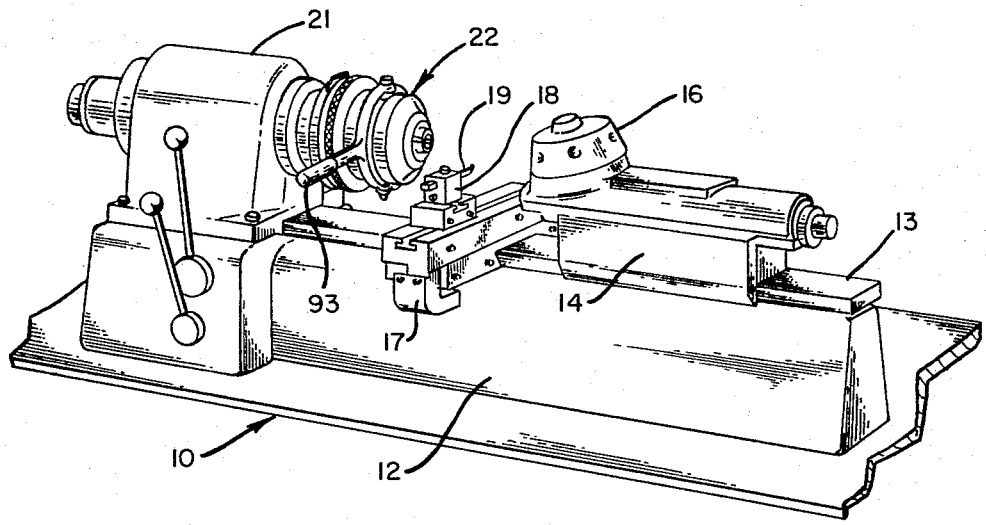
FIGURE 1 is a perspective view of a lathe upon which the novel work holding device, or chuck, of this invention is shown mounted.

Referring now to FIGURE 1 of the drawings, there is shown a conventional turret lathe 10 which includes a base 12 having an elongated way 13 upon which a turret slide 14 with a turret head 16 thereon is mounted. A tool holder slide 17 with a tool holder 18 and tool 19 is also shown mounted on the way 13. The lathe headstock 21 is attached to the base 12 and carries the novel chuck 22 of this invention.

Figure 2:
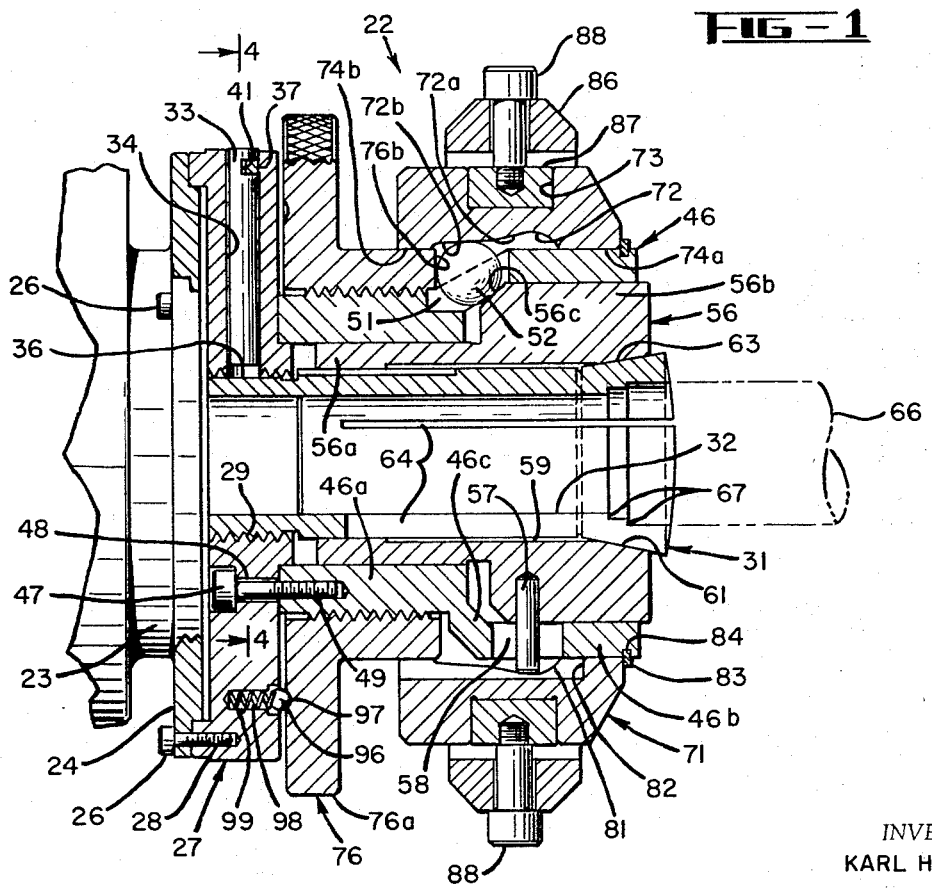
FIGURE 2 is a longitudinal cross sectional view of the chuck shown in a closed position.

Referring to FIGURE 2, the lathe spindle 23 which is driven by the lathe motor (not shown) is provided with a face plate 24 to which the chuck 22 is attached. The novel chuck comprises an annular disc 27 having tapped holes 28 in one face thereof. Fastening screws 26 extend through holes formed in the face plate 24 of the lathe and engage the tapped holes 28 in the disc 27 to secure the chuck to the lathe face plate. The disc 27 is provided with a tapped inner bore 29 in which the work holding device 31 is threadedly received. In the illustrated arrangement the work holding device 31 is shown comprising a conventional collet chuck having a bore 32 therethrough. Other work holding devices such as a step chuck, may be employed.

Figure 4:
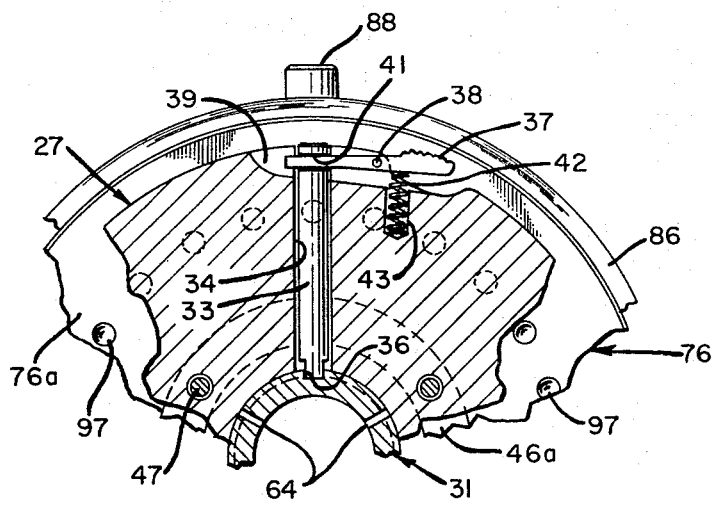
FIGURE 4 is a fragmentary sectional view taken along line 4—4 of FIGURE 2.

A radially movable locking pin 33 is positioned in a radially extending bore 34 formed through the disc 27. In the normal locking position, the inner end of the pin 33 projects into a longitudinal keyway 36 formed in the work holding device 31 whereby relative rotary movement between the disc and work holding device is prohibited. Referring also to FIGURE 4, an actuating lever 37 for the locking pin is shown pivotally mounted intermediate the ends thereof on a pin 38 extending between the walls of a groove 39 formed in the edge of the disc. One end of the lever 37 extends into a groove 41 formed at the outer end of the locking pin 33. A spring 42 carried in a bore 43 in the disc engages the bottom of the other end of the lever 37 to resiliently bias the same in a counterclockwise direction as viewed in FIGURE 4 thereby urging the locking pin 33 into the keyway 36 when the pin and keyway are in alignment. By pressing on the lever and raising the locking pin, the collet 31 is released and may be removed from the chuck and replaced with another collet. With the locking pin in position in the groove, the collet is fixedly secured to the face plate of the lathe through the disc 27 and no relative axial or rotary movement therebetween is possible.

A ball-retaining sleeve 46 is fixedly secured to the front end of the disc 27 by capscrews 47 which extend through counterbored holes 48 in the disc 27 and threadedly engage tapped holes 49 formed in one end of the sleeve 46, as seen in FIGURE 2. The retaining sleeve 46 has small and large diameter sections 46a and 46b, respectively, interconnected by an intermediate section 46c which in the illustrated chuck, comprises a tapered or flared wall section. If desired, the wall 46c could extend radially between the inner and outer sections 46a and 46b. A plurality of circumferentially spaced apertures 51 (see also FIGURE 5) are formed in the tapered wall section 46c which apertures extend into the large diameter section 46b. Force transmitting members 52 in the form of balls in the illustrated arrangement are retained in the holes 51 in the retaining sleeve. Force transmitting members of other shapes may be used if desired.

The balls 52 are employed to transmit an actuating force to a work holding actuating sleeve 56 for axial slide actuation of the sleeve. The actuating sleeve 56 is shown slidably mounted within the retaining sleeve 46. As seen in FIGURE 2 the inner end 56a of the sleeve 56 is formed with an outside diameter slidably received in the small diameter section 46a of the retaining sleeve. An enlarged diameter section 56b slides within the large diameter section 46b of the retaining sleeve. Intermediate the large and small outside diameter sections of the actuating sleeve is a tapered or flared wall section 56c engageable by said force transmitting members 52.

A radially extending pin 57 is secured to the actuating sleeve 56 and projects through an elongated slot 58 formed in the retaining sleeve 46 to prohibit relative rotary movement therebetween. In addition, the pin 57 prevents the actuating sleeve 56 from falling out of the retaining sleeve 46 when the collet 31 is removed from the apparatus.

The bore 32 of the work holding device 31 is coaxial with the bore 59 of the actuating sleeve 56. The bore 59 in the actuating sleeve 56 has an outwardly flared or tapered portion 61 at the front end thereof, and the work holding device 31 has an outwardly tapered outer front end surface 63 adapted for engagement with said tapered bore section 61. A plurality of longitudinally extending slots 64 are formed through the side walls of the work holding device 31 and permit the diameter of the bore 32 thereof to be decreased upon axial movement of the actuating sleeve 56 to the right (as viewed in FIGURE 2) due to the coaction of the tapered surfaces 61 and 63 thereon. In FIGURE 2 a workpiece 66 is shown held by the collet chuck or work holding device 31. In the illustrated arrangement, the bore 32 has a stepped diameter front end with shoulders 67 formed therein against which the end of the workpiece may be butted to accurately, relatively axially locate the workpiece with said chuck. Other well known means such as a back stop plug not shown, may be mounted in the bore 32 to limit axial movement of the workpiece being chucked.

As mentioned above, axial movement of the actuating sleeve 56 for clamping actuation of the work holding device is obtained through the force transmitting balls 52. Actuation of the balls 52 in an inwardly radial direction against the tapered wall portion 56c of the actuating sleeve 56 is under control of an axially slidable locking ring 71. The locking ring as seen in FIGURES 2, 3, 6 and 7 has annular inner and outer grooves 72 and 73 formed therein. The depth of the inner groove changes from end to end thereof, and in the illustrated arrangement the front end portion 72a of the groove has a greater depth than the generally flat rear end portion 72b thereof which is shallow. The bottom of the groove 72 comprises a cam surface adapted for engagement with the force transmitting balls 52 for urging them radially inwardly when the locking sleeve is slid forward from the chuck open position shown in FIGURE 3 to the chuck closed position shown in FIGURE 2. The axial bore through the locking ring 71 has forward and rear cylindrical sections 74a and 74b, respectively, of the same diameter which slide along the large diameter section 46b of the retaining sleeve and an adjusting ring 76, respectively.

Figure 3:
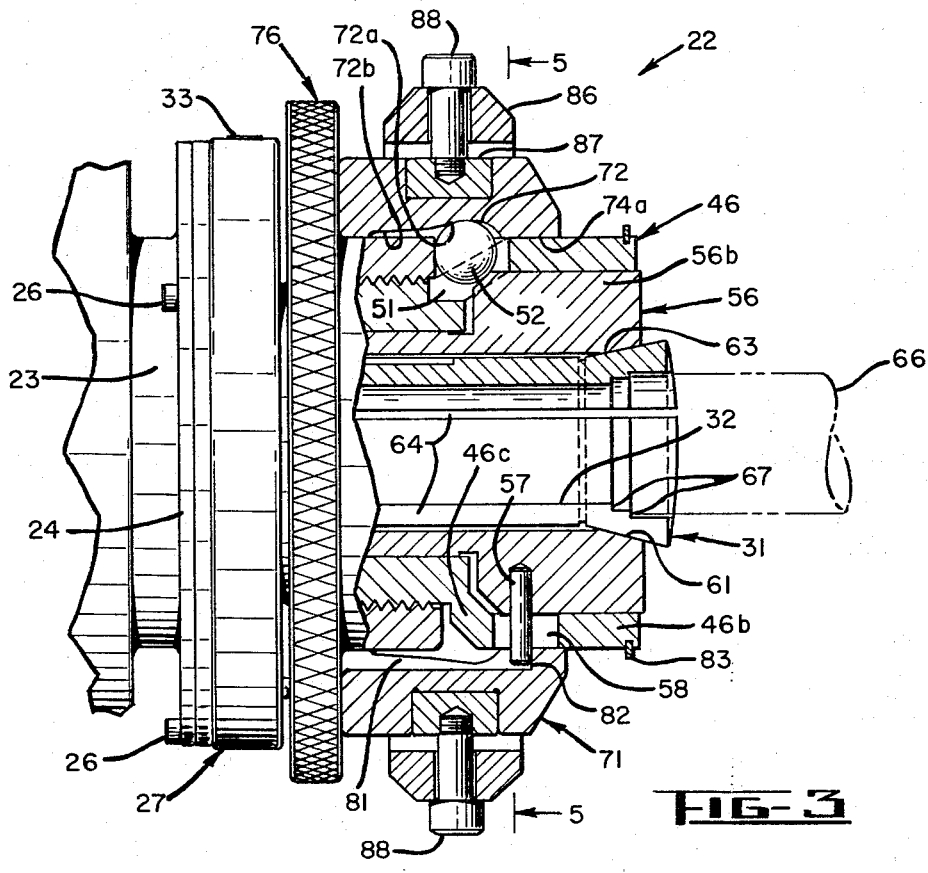
FIGURE 3 is a view which is similar to that of FIGURE 2 but showing the chuck in open position.

As seen in FIGURES 2 and 3, a longitudinal keyway 81 is formed in the locking ring 71 which extends from the rear end thereof and terminates a spaced distance from the forward end of the ring at a wall 82. The outer end of the radially extending pin 57 projects into the keyway 81 to prevent relative rotary motion of the locking collar 71, retaining ring 46 and actuating sleeve 56. It will be seen that when the locking collar is moved rearwardly the end 82 of the keyway engages the pin 57 to drive the pin and attached actuating collar 56 rearwardly. Rearward movement of the locking collar 71 is stopped when the locking collar 71 engages the radial flange portion 76a of the adjusting ring 76 as shown in FIGURE 3. It will here be noted that when the locking collar 71 is slid rearwardly as described above, the actuating sleeve 56 is positively axially driven to the left as viewed in FIGURES 3 and 6 to permit the chuck 31 to spring open and release the workpiece 66. It will here be noted that the tapered surfaces 61 and 63 remain in engaged condition at all times during use of the chuck thereby preventing chips or dirt from entering therebetween. A stop ring 83 in a groove 84 at the forward end of the retaining sleeve 46 limits forward movement of the locking collar 71 at the closed position of the chuck.

Figure 5:
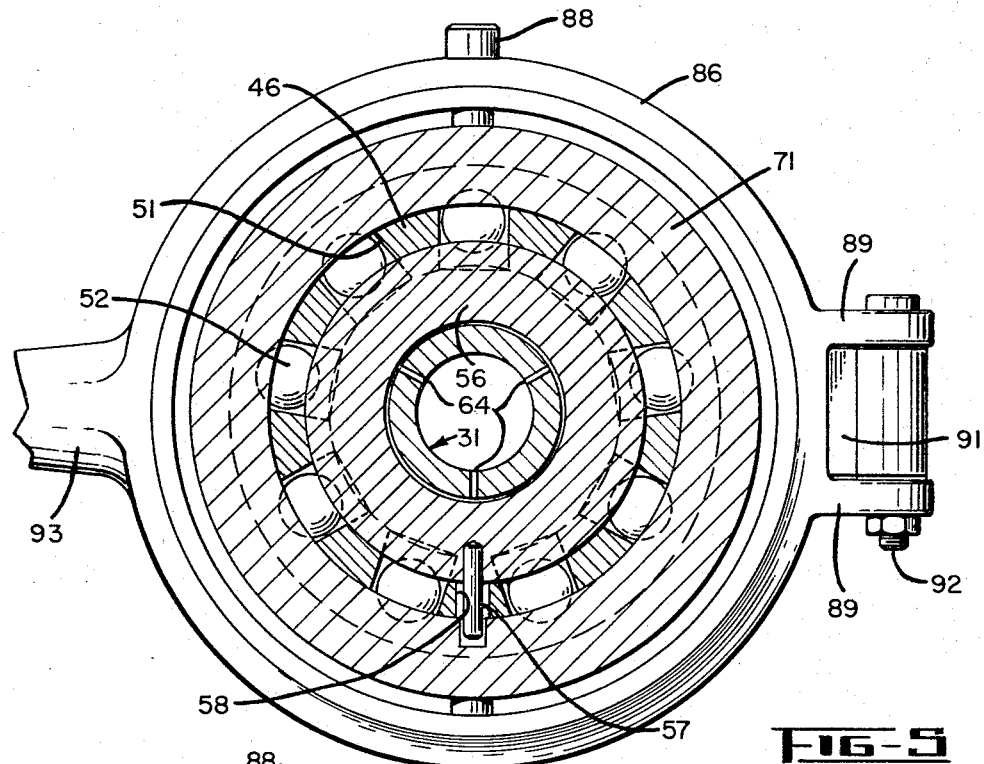
FIGURE 5 is a cross sectional view taken on line 5—5 of FIGURE 3.
Figure 6:
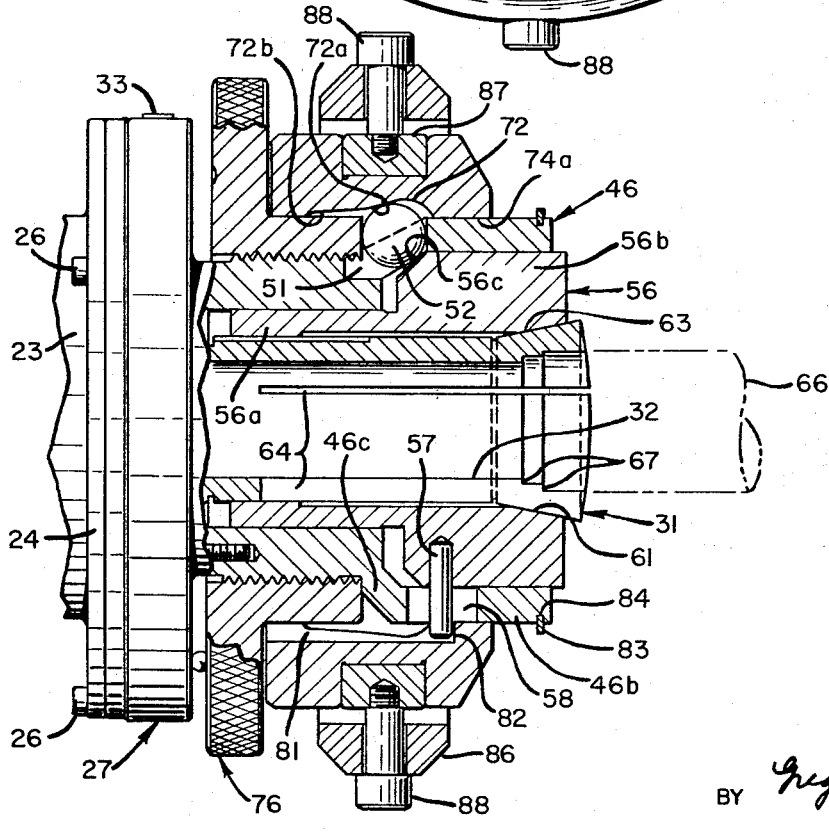
FIGURE 6 is a longitudinal cross sectional view showing the chuck in open position and adjusted for gripping undersized workpieces.
Figure 7:
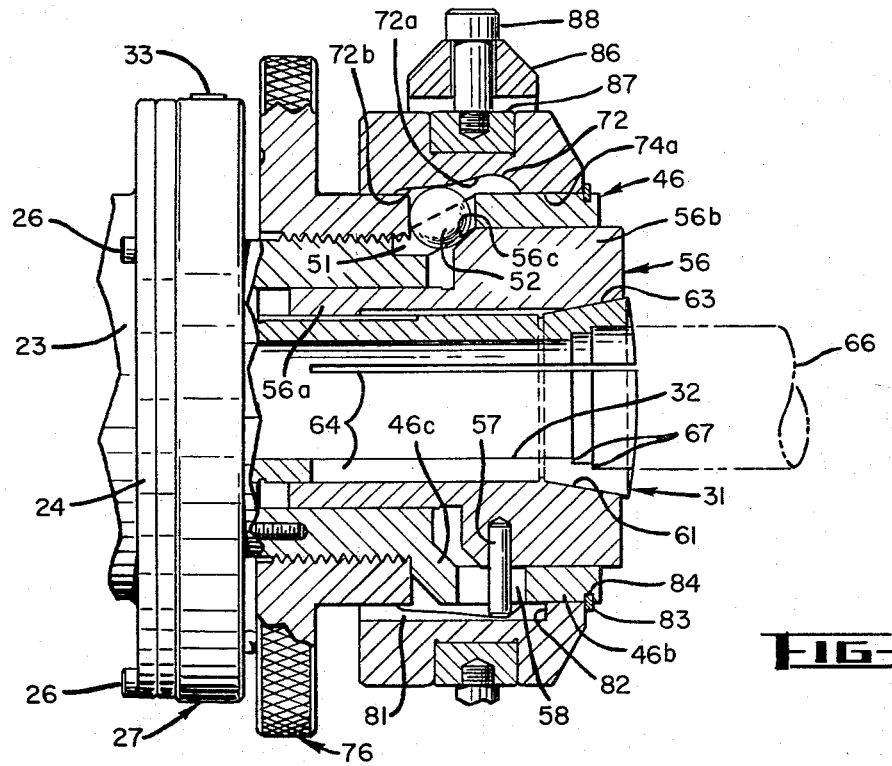
FIGURE 7 is a view which is similar to FIGURE 6 but showing the chuck in a closed condition.

Any suitable means may be employed for slide actuation of the locking collar 71 between chuck open and chuck closed positions. A conventional means is shown which includes a yoke 86 which surrounds the ring 71 a spaced distance therefrom. A ring 87 is positioned in the annular groove 73 which ring is attached by capscrews 88 to the yoke. The yoke is carried at the end of a pivotal link 91 (see FIGURE 5) which extends from the headstock 21 of the lathe. As seen in FIGURE 5, the yoke has spaced ears 89 extending outwardly therefrom which are pivotally attached to the outer end of the link 91 by a pivot pin 92. Pivot means, not shown, connect the other end of the link 91 to the headstock 21. A handle 93 extends from the yoke diametrically opposite the pivot pin 92 for pivoting said yoke about the pivot pin. As the yoke is pivoted, the ring 87 in the groove 73 engages the side of the groove for slide actuation of the locking ring 71 in an axial direction. It will be apparent that the locking ring may be actuated between open and closed position when the chuck is either being rotated or is stopped.

The adjusting ring 76 mentioned above forms an important feature of this invention. It is shown comprising a cylindrical sleeve having a radial flange 76a at the rear end thereof. The bore of the sleeve is threaded for engagement with the threaded small diameter section 46a of the retaining sleeve. The edge of the flange 76a is knurled to provide a finger-gripping surface for rotation of the adjusting sleeve on the retaining sleeve. It will be apparent that the adjusting ring 76 is axially moved along the retaining sleeve 46 upon relative rotation of the ring 76 and sleeve 46. The forward end wall surface 76b of the adjusting ring abuts the force transmitting members 52 for axial adjustment thereof within the apertures 51 in the retaining sleeve, the apertures 51 being of sufficient size to permit such axial adjustment of the force transmitting members.

A resiliently biased ball 96 carried by the disc 27 is adapted to engage sockets 97 formed on the read wall of the flange 76a. A compression spring 98 in a hole 99 in the disc 27 abuts the bottom of the hole at one end and the ball 96 at the other end to resiliently bias the ball 96 into one of the circumferentially spaced sockets 97 when the socket and ball are in alignment. It will be apparent that the ball and socket arrangement provides a releasable detent means for releasably locking together said adjusting ring and disc. As the adjusting ring is rotated by hand, as described above, the ball 96 will enter and leave the sockets 97. As seen in FIGURE 4 the sockets 97 may be angularly spaced at about 10 degrees apart.

Figure 8:
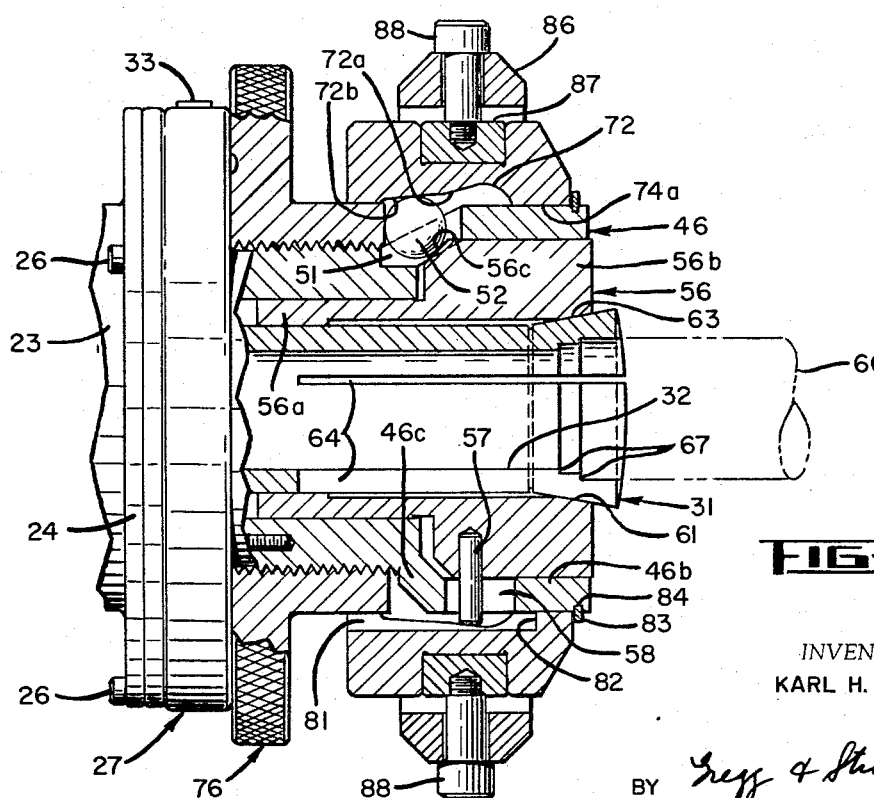
FIGURE 8 is a longitudinal cross sectional view of the chuck shown in a closed position and adjusted for gripping oversized workpieces.

To install a collet 31 in the apparatus, the adjusting ring 76 is rotated on the retaining sleeve 46 into abutting relation with the disc 27, as shown in FIGURE 8, and the locking collar 71 is slid rearwardly into abutting relation with the adjusting ring flange 76a. The locking pin 33 is moved radially outwardly by pressing the actuating lever 37 (see FIGURE 4) to release the collet. The collet in the device is then removed by unscrewing the same from the threads 29 and is replaced with a collet of the desired size. The collet 31 is threaded into the disc 27 a sufficient distance for engagement of the tapered surfaces 61 and 63. The lever 37 is released and the collet is unscrewed until the locking pin engages slot 36 in the collet. The tapered surfaces 61 and 63 remain in engagement at all times that the collet is locked in the apparatus.

In order to clamp the workpiece 66 in the work holding device 31, the locking collar 71 is slid rearwardly to the chuck open position by actuation of the operating handle or lever 93 (see FIGURE 1). The collet actuating sleeve 56 is driven to the left through engagement of the groove end wall 82 on the locking collar 71 with the pin 57 for the positive drive of the actuating sleeve along the work holding device 31 thereby permitting the work holding device 31 to spring open. The workpiece 66 is then inserted into the work holding device 31, with the end of the workpiece in abutting relation with one of the shoulders 67 to limit the axial movement thereof. With the workpiece in position in the work holding device, the handle 93 (FIGURE 1) is pivoted to slide the locking collar 71 forward to a chuck closed position as shown in FIGURE 2. As the locking collar is slid forward, the camming groove 72 urges the force transmitting balls 52 radially inwardly thereby pressing the balls against the tapered wall section 56c of the actuating sleeve. Because of the taper of the wall section 56c, an axial force component is transmitted to the actuating sleeve 56 to drive the same axially forward. When the actuating sleeve 56 is slid forward the tapered surfaces 61 and 63 on the actuating sleeve 56 and work holding device 31, respectively, coact to decrease the diameter of the bore of the work holding device and clamp the workpiece 66 therewithin. To remove the workpiece the locking collar is merely slid back to the chuck open position in the manner described above.

It will here be noted that with the arrangement of this invention, the retaining sleeve 46 only circumferentially confines the force transmitting balls 52. During work clamping operation, the force transmitting balls are wedged between the end face 76b of the adjusting ring 76, the tapered wall 56c of the actuating sleeve 56 and the cam groove 72. It will be apparent that when so wedged, the balls are capable only of generally radial movement along the face 76b of the adjusting ring, and that axial movement of the balls is prohibited. In a manner described below, when the chuck is opened, the axial position of the force transmitting balls may be adjusted by rotation of the adjusting ring 76. The reasons and need for such adjustment will become apparent hereinbelow.

As is well understood work holding devices such as the split collet chuck 31 are capable of gripping workpieces within a range of diameters. Assume now that an undersized bar or workpiece 66 is to be gripped in the work holding device. When the locking collar 71 is slid forward into chuck closing or clamping position with an undersized workpiece in the chuck, the jaws of the collet 31 may not close sufficiently to clamp the same onto the workpiece. With the novel arrangement of this invention, the chuck may be readily adjusted to accommodate such workpiece without axially moving the work holding device 31. To adjust the apparatus for an undersize workpiece, the locking collar 71 is slid rearwardly into open position as shown in FIGURE 3, and the adjusting ring is rotated to move the same forward, i.e., to the right, as viewed in FIGURE 3. The force transmitting balls 52 which are in engagement with the end 76b of the ring 76 are thereby also axially shifted to the right. Since the balls 52 are wedged between the end face 76b, the tapered wall 56c and the cam groove 72, the actuating sleeve 56 is shifted to the right by the balls 52 the same distance that the adjusting ring and balls are shifted. As the sleeve 56 is moved to the right the tapered surfaces 61 and 63 coact to decrease the diameter of the collet 31 at the work-gripping end thereof. The diameter of the bore of the collet 31 in the chuck open position is thereby decreased. Now when the locking collar 71 is moved to the chuck closed position, illustrated in FIGURE 7 the collet 31 is further closed for gripping an undersized workpiece. It here will be noted that regardless of the axial position of the adjusting sleeve 76, the force transmitting balls 52 are driven the same radial distance by the cam surface 72 on the locking ring 71 when the locking ring is moved from chuck open to chuck closed position. Consequently, the actuating sleeve 56 is axially moved the same distance by the balls when the locking sleeve 71 is moved between chuck open and closed positions. Therefore, with the actuating sleeve 56 adjusted to the right as viewed in FIGURE 6, the collet is closed further to grip the undersized workpiece when the locking sleeve is moved to the chuck closed position shown in FIGURE 7.

In FIGURE 8 of the drawings to which reference is now made, the chuck is shown adjusted for gripping an oversize workpiece. For this use, the adjusting ring 76 is moved by rotation to the left as viewed in FIGURE 8. After moving the adjusting ring to the left, the locking ring 71 is slid back against the flange 76a on the locking ring to drive the actuating sleeve 56 to the left through the pin connection 57. The collet 31 thereupon springs open to an enlarged diameter. Now when the locking collar 71 is slid to the chuck closed position, illustrated in FIGURE 8 an oversized workpiece may be clamped therein. It will be readily apparent that a wide range of workpieces may be accommodated with the novel chuck of this invention.

The invention having been described in detail and in accordance with the requirements of the patent statutes various changes and modifications may suggest themselves to those skilled in the art and it is intended that such changes and modifications shall fall within the spirit and scope of the invention as recited in the appended claims.

I claim:

1. In a work holding chuck a retaining sleeve having small and large diameter sections interconnected by an intermediate wall section therebetween which is formed with a plurality of circumferentially spaced apertures therethrough, an actuating sleeve having two different outside diameter sections and a tapered wall section therebetween which actuating sleeve is slidably mounted in the large and small diameter sections of said retaining sleeve, an adjusting ring on said small diameter section of said retaining sleeve and adjustably positioned therealong, a plurality of force transmitting members in the apertures in said retaining sleeve and adapted to abut said adjusting ring and the tapered section of said actuating sleeve, and an axially slidable locking ring having a cam surface formed on the inner wall thereof adapted for engagement with said force transmitting members for urging the same into wedging engagement between said adjusting ring and tapered section of said actuating sleeve for slide actuation of said actuating sleeve within said retaining sleeve.

2. The work holding chuck defined by claim 1 wherein the adjusting ring and small diameter section of said retaining sleeve are formed with cooperating threads for axial adjustment of the adjusting ring therealong.

3. The work holding chuck defined by claim 1 including a work holding device positioned in said actuating sleeve, means securing said work holding device to said retaining sleeve, said work holding device and actuating sleeve being formed with cooperable tapered surfaces for clamping actuation of the work holding device on a workpiece when said actuating sleeve is axially moved therealong.

4. A work holding chuck comprising a retaining sleeve formed with a plurality of circumferentially spaced apertures therethrough, an actuating sleeve slidably mounted inside said retaining sleeve, force transmitting members in said aperture and engaging said actuating sleeve for axial slide actuation of said actuating sleeve within the retaining sleeve, means operable between chuck open and closed positions for generally inwardly radially actuating said force transmitting members within said apertures, adjusting means operable through said force transmitting members for adjusting the axial position of said actuating sleeve independently of said means for actuating said force transmitting means, said adjusting means including an adjusting ring axially movably positioned along said retaining sleeve and adapted for engagement with said force transmitting members for adjustment of the axial position thereof within said apertures in the retaining sleeve, an annular disc attached to one end of said retaining sleeve, means for connecting said disc to a machine tool, and releasable detent means between said adjusting ring and disc for releasably locking said adjusting ring and disc together.

5. A work holding chuck comprising a retaining sleeve formed with a plurality of circumferentially spaced apertures therethrough, an actuating sleeve slidably mounted inside said retaining sleeve, force transmitting members in said apertures and engaging said actuating sleeve for axial slide actuation of said actuating sleeve within the retaining sleeve, means including a locking collar axially slidable along said retaining sleeve and having an inside groove in the form of a cam surface adapted for engagement with said force transmitting members, said locking collar being movable between opposite end chuck open and closed positions for generally inwardly radially actuating said force transmitting members within said apertures, a radially extending pin carried by said actuating sleeve, said retaining sleeve being formed with an elongated slot through which said pin extends, said locking collar being formed with an elongated axial groove into which said pin extends, and said groove being formed with an end wall adapted for engagement with said pin when said locking collar is moved to chuck open position to positively axially slide said actuating sleeve to chuck open position, and adjusting means operable through said force transmitting members for adjusting the axial position of said actuating sleeve independently of said means for actuating said force transmitting means.

References Cited by the Examiner

UNITED STATES PATENTS

| 2,475,519 | 7/1949 | Robichaud | 279—50 |
| 2,735,686 | 2/1956 | Cox | 279—47 |
| 2,769,643 | 11/1956 | Denzler | 279—37 |
| 2,998,259 | 8/1961 | Farnsworth | 279—50 |
| 3,095,205 | 6/1963 | Farnsworth | 279—74 |

HAROLD D. WHITEHEAD, *Primary Examiner.*

H. V. STAHLHUTH, *Assistant Examiner.*